(12) United States Patent
Bracewell et al.

(10) Patent No.: US 9,537,816 B2
(45) Date of Patent: Jan. 3, 2017

(54) API FOR REPRESENTING A MAILBOX IN A MESSAGE SYSTEM

(75) Inventors: Shawn Bracewell, Duvall, WA (US);
Sidney L. Taylor, Redmond, WA (US);
Karim M. Batthish, Seattle, WA (US);
David Sterling, Flemington, NJ (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1179 days.

(21) Appl. No.: 11/656,574

(22) Filed: Jan. 23, 2007

(65) Prior Publication Data

US 2008/0177845 A1    Jul. 24, 2008

(51) Int. Cl.
*G06F 15/16* (2006.01)
*H04L 12/58* (2006.01)

(52) U.S. Cl.
CPC .............. *H04L 51/36* (2013.01); *H04L 51/22* (2013.01)

(58) Field of Classification Search
CPC ................................ H04L 51/22; H04L 51/36
USPC ........ 709/217, 218, 204, 206; 707/609, 705, 707/821, 999.001, 999.1
See application file for complete search history.

(56) References Cited

U.S. PATENT DOCUMENTS

| | | | | |
|---|---|---|---|---|
| 5,333,266 A | * | 7/1994 | Boaz et al. | ................... 709/206 |
| 6,230,156 B1 | | 5/2001 | Hussey | |
| 6,405,225 B1 | | 6/2002 | Apfel et al. | |
| 6,430,177 B1 | | 8/2002 | Luzeski et al. | |
| 6,539,077 B1 | * | 3/2003 | Ranalli et al. | ............... 379/67.1 |
| 6,990,514 B1 | * | 1/2006 | Dodrill et al. | ................ 709/206 |
| 7,076,730 B1 | | 7/2006 | Baker | |
| 2001/0032245 A1 | * | 10/2001 | Fodor | .......................... 709/206 |
| 2003/0069887 A1 | | 4/2003 | Lucovsky et al. | |
| 2003/0135565 A1 | | 7/2003 | Estrada | |
| 2005/0283520 A1 | | 12/2005 | Gardner et al. | |
| 2006/0010221 A1 | | 1/2006 | Srinivasan | |
| 2006/0018444 A1 | * | 1/2006 | Pantana et al. | ............ 379/88.17 |

OTHER PUBLICATIONS

"Class Members". MSDN. Downloaded from <https://msdn.microsoft.com/en-us/library/10cwk72y.aspx> on Mar. 9, 2015.*
Bajorek. "Unified Messaging". Apr. 30, 1997.*
"Exchange_Mailbox Class". Downloaded from <https://msdn.microsoft.com/en-us/library/aa143732(v=exchg.65).aspx> on Mar. 7, 2016.*

(Continued)

*Primary Examiner* — Scott B Christensen
(74) *Attorney, Agent, or Firm* — Danielle Johnston-Holmes; Tom Wong; Micky Minhas (57) ABSTRACT

The disclosed architecture is an application program interface (API) that includes a collection of class members defined in a single class for accessing mailboxes in messaging storage locations in an enterprise organization. Each mailbox in the organization has an identity that primarily encapsulates at least a mailbox server name, a unique mailbox database GUID (globally unique identifier), and a unique mailbox GUID. By encapsulating information associated with a mailbox into one class, database lookups can be optimized and a single source of mailbox information provided for both authentication and display purposes. Other information can also be encapsulated.

19 Claims, 9 Drawing Sheets

(56) References Cited

OTHER PUBLICATIONS

"Integration Platforms of SAP R/3 with Lotus Notes", Date: Nov. 17, 2006, https://www.sdn.sap.com/irj/sdn/weblogs?blog=/pub/wlg/4971.

"Mailbox Sharing", https://arl.org/Guide/Sharing.html#MultiAccess.

Weinrot, David, "StrongMail Email Integration Server—Seamless email integration with existing business applications", http://www.strongmail.com/pdf/sm_datasheet_eas.pdf.

* cited by examiner

```
namespace Microsoft.Exchange.Data.Storage
{
        internal sealed class ExchangePrincipal : System.Security.Principal.IPrincipal
        {
                public static ExchangePrincipal FromWindowsIdentity(WindowsIdentity windowsIdentity)
                public static ExchangePrincipal FromUserSid(SecurityIdentifier userSid)
                public static ExchangePrincipal FromProxyAddress(string proxyAddress)
                public static ExchangePrincipal FromLegacyDN(string legacyDN)
                public static ExchangePrincipal FromADSystemMailbox(ADSystemMailbox
adSystemMailbox, string serverFqdn)
                public static ExchangePrincipal FromMailboxGuid(Guid mailboxGuid)
                public static ExchangePrincipal FromDirectoryObjectId(ADObjectId directoryEntry)
                public static ExchangePrincipal FromADUser(ADUser user)
                public static ExchangePrincipal FromMailboxData(string displayName, string serverFqdn,
string serverLegacyDN, string mailboxLegacyDN, Guid mailboxGuid, Guid mdbGuid,
string primarySmtpAddress)

public string DisplayName { get; }
                public string LegacyDistinguishedName { get; }
                public PreferredCultures PreferredCultures { get; }
                public string ServerFullyQualifiedDomainName { get; }
                public int ServerVersion { get; }
                public bool IsLegacyServer { get; }
                public string ServerLegacyDistinguishedName { get; }
                public Guid MailboxGuid { get; }
                public bool PreferMailboxLegacyDN { get; set; }
                public Guid MdbGuid { get; }
                public ADObjectId ADObjectId { get; }
                public ADObjectId DirectorySearchRoot { get; }
                public System.Security.Principal.SecurityIdentifier UserSid { get; }
                public IList<ADObjectId> Delegates { get; }
                public string PrimarySmtpAddress { get; }
                public ProxyAddress ExternalEmailAddress { get; }
                public bool IsCrossForest { get; }
                public uint? MailboxFolderSet { get; }
                public bool OWAEnabled { get; }
                public IIdentity Identity { get; }
                public void ForceMdbGuid(Guid mdbGuid)
                public bool IsInRole(string role);
                public void Save();
                public void ForceServerLegacyDistinguishedName(string serverLegacyDN)
                public bool CanActAsOwner(WindowsIdentity authenticatedUser)
                public bool CanActAsOwner(IntPtr authenticatedUserHandle)
                public System.DateTime GetPasswordExpirationDate()
                public bool ResetPassword(SecureString newPassword)
        }
}
```

API FOR REPRESENTING A MAILBOX IN A MESSAGE SYSTEM

BACKGROUND

The advances in both IP and cellular networks serve as the catalyst for enormous amounts of information exchange. Users can utilize many different types of devices such as portable computers and cell phones to access and disseminate information from most any location. In particular, wireless and mobile capabilities are becoming principal forms of communication and data access. With the widespread deployment of wireless services mobile information workers play a key role in many corporate business operations. Employees that travel, such as sales representatives and field service technicians, for example, require access to mail, contacts information, calendar, etc., from anywhere.

Businesses realize that communications is a very important investment not only for promoting products and services, but also for maintaining employee productivity. More recent developments include enterprise-class solutions that provide security and policy-driven solutions for messaging and data exchange for computing and mobile devices. For example, collaboration systems allow employees to communicate in shared environments to discuss topics of interest and exchange information on related topics.

However, these conventional attempts at unified solutions are only partially successful. Corporate systems can typically include a blend of legacy backend and communications systems some of which are sufficiently compatible to facilitate a partial solution to existing needs. Niche vendors provide patchwork interfaces to make these systems work in some basic fashion. However, it is desirable to have a software component that provides a universal solution to the wide variety of systems and data that enterprises employ. Such a system could deliver a significant reduction in total-cost-ownership and a significantly improved user experience whether online, across a range of network connections, or offline.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The disclosed architecture comprises an application programming interface (API) for representing and accessing all messaging storage locations (e.g., mailboxes) in an organization. The disclosed API is part of an API layer that captures business logic associated with e-mail messages, contacts, and calendar items, for example. In the context of user mailboxes, each mailbox in the organization has an identity (also referred to a principal). The identity primarily encapsulates a mailbox server name, a unique mailbox database GUID (globally unique identifier), and a unique mailbox GUID. By encapsulating information associated with a mailbox into one class, database (e.g., Active Directory) lookups can be optimized and a single source of mailbox information provided for both authentication and display purposes. The API facilitates integrating communications data and information into the enterprise organization.

In other words, the architecture employs the API to represent the identity of a mailbox in an organization that utilizes a messaging and/or collaboration server system. In combination with user authentication, the class facilitates establishing a session to the mailbox server for the purpose of accessing data stored in that mailbox. Information that can be encapsulated includes the server where the mailbox is located, a unique identifier for the database on that server that contains the mailbox, and a unique identifier for the mailbox itself. Other information can also be encapsulated.

In one implementation, the API is provided through a messaging API layer called Exchange Server Objects (XSO) as part of a communications and collaborations server product (e.g., Exchange Server™ by Microsoft Corporation). The API can be positioned as part of a middle-tier system for providing an interface for many different applications. The API also adds collaborative functionality to applications (e.g., Net Runtime™ and Framework™, Microsoft Outlook™, Microsoft Office Communicator™, Microsoft CRM™ (Customer Relationship Management), and so on). The API facilitates the integration of communications data and services such as e-mail notifications, shared calendaring, contacts and tasks into line-of-business applications such as sales force automation. Moreover, the API can be remotely manageable and accessible such that applications can utilize functionality from anywhere in the organization in support of mobile and web-based access.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 5 illustrates an exemplary class of class objects for utilization in a communications server.

DETAILED DESCRIPTION

The disclosed innovation comprises an application programming interface (API) for representing, in one implementation, all mailboxes in an enterprise organization. The API layer in which the disclosed API resides encapsulates all business logic associated with messages (e.g., e-mail), contacts, and calendar items, for example. Every mailbox in the organization has an identity (also referred to a principal). The identity primarily encapsulates a mailbox server name or names, a mailbox database GUID (globally unique identifier), a unique mailbox GUID as well as the identity of the security principal or principals associated with the mailbox. By encapsulating information associated with a mailbox into one class, LDAP (lightweight data access protocol)-based database (e.g., Active Directory) lookups can be optimized and a single source of mailbox information provided for both authentication and display purposes. The API layer facilitates integrating communications data and information into the enterprise organization.

A mailbox can be described as an area in memory or on a storage device where e-mail, calendar, contacts, journal, notes, tasks and other personal information is placed. In messaging systems, each user has a private mailbox. When the user receives a message (e.g., e-mail), the system automatically places it in the mailbox. A mailbox store is a database for storing mailboxes (or inboxes). Mailbox stores can store data that is private to an individual and contain mailbox folders generated when a new mailbox is created for an individual. In one implementation of the API, users are able to send messages using a variety of tools, including Web-based Distributed Authoring and Versioning (WebDAV), Simple Mail Transfer Protocol (SMTP), XML Web Services (e.g., WS-I-compliant), voice-based access to send and receive mail, and Messaging Application Programming Interface (MAPI). Users can receive messages in private mailbox folders in the store, which can be accessed using WebDAV, Post Office Protocol version 3 (POP3), Web Services, Internet Message Access Protocol (IMAP4), telephone/voice-based access, and/or MAPI.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

Figure 1:
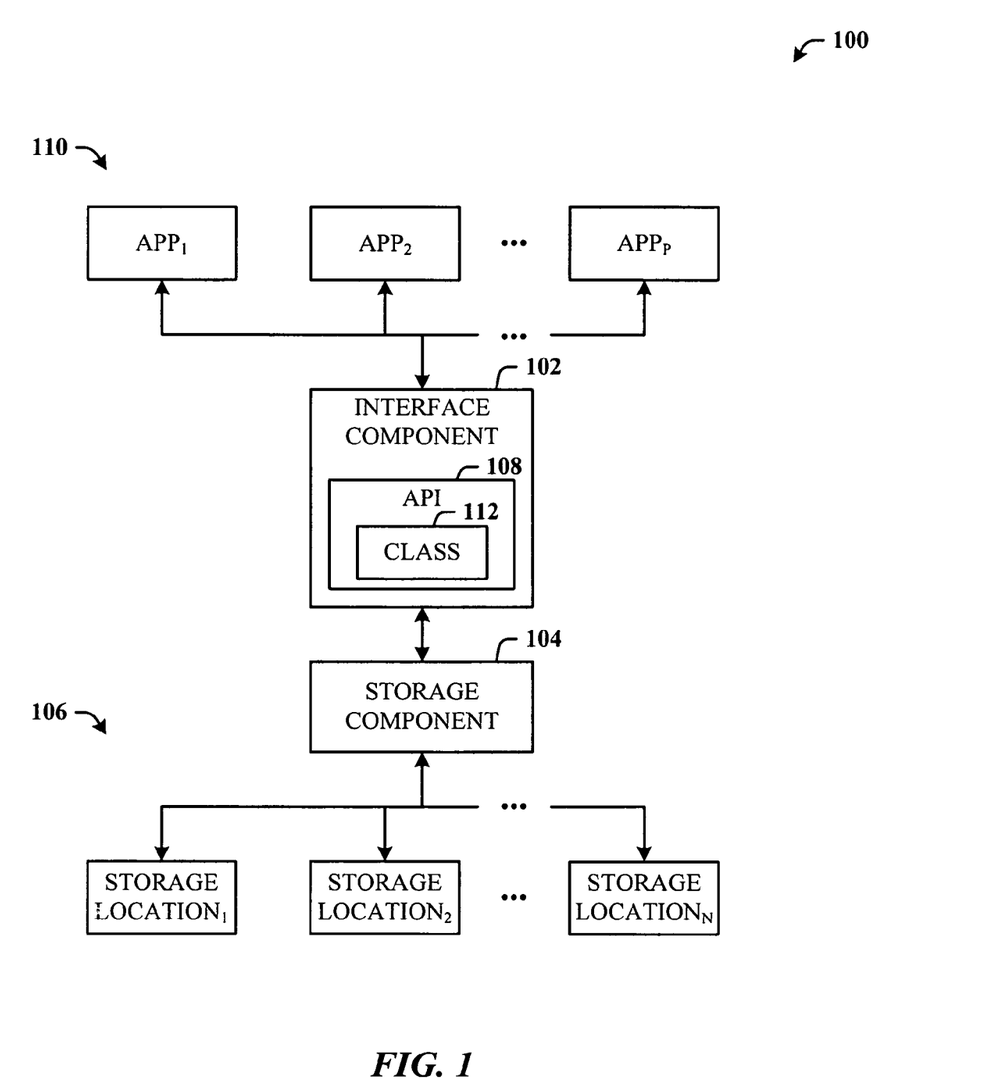
FIG. 1 illustrates a computer-implemented system that includes an interface component for accessing data and information.

Referring initially to the drawings, FIG. 1 illustrates a computer-implemented system 100 that includes an interface component 102 for accessing data and information. The system 100 includes a storage component 104 that facilitates the storage of messages and content of disparate data types in storage locations 106 (denoted STORAGE LOCATION$_1$, STORAGE LOCATION$_2$, . . . , STORAGE LOCATION$_N$, where N is a positive integer) (e.g., e-mail inbox) associated with users. The messages can include data types such as text, voice, graphics, video, images, and/or audio, for example, content which can be considered part of multimedia and which can be communicated via wired and/or wireless clients. This can also include data such as calendar items that include appointments and meetings, and attachments such as open standards-based or proprietary binary streams that are transported and stored and do not need to be directly understood by the system. For example, a cell phone with messaging capability can send a text message that also includes captured images, short video clips, voice files, etc., all of which can be stored in an associated user storage location (e.g., user inbox or mailbox) of an enterprise communications system. The storage component 104 can be associated with a single datastore of the storage locations 106, multiple datastores that include storage locations 106, or multiple datastores across which the storage locations 106 are distributed.

The interface component 102 comprises an API 108 via which one or more applications 110 (denoted APP$_1$, APP$_2$, . . . , APP$_P$, where P is a positive integer) can access the storage component 104 and associated storage locations 106. The API 108 defines a class 112 of objects (or class members) that serve as a single means for universally accessing each of the storage locations 106 using the different applications 110. For example, the system 100 can be an enterprise communications system (e.g., middle-tier) that facilitates the routing and storage of enterprise user messages, such as e-mail to the corresponding user storage location (e.g., STORAGE LOCATION$_1$). The applications 110 can include clients associated with devices that facilitate mobile access, web access, voice access, and e-mail access, for example.

In one implementation of the API 108, users of the different applications 110 are able to send messages using a variety of tools, including but not limited to, Web-based Distributed Authoring and Versioning (WebDAV), Simple Mail Transfer Protocol (SMTP), XML Web Services (e.g., WS-I-compliant), Web-/browser-based and voice-access applications hosted on a server, and Messaging Application Programming Interface (MAPI). Moreover, users can receive messages in storage locations 106 (e.g., private mailbox folders), which can be accessed using WebDAV, Post Office Protocol version 3 (POP3), IMAP, XML Web Services (e.g., WS-I-compliant), Web-/browser-based and voice-access applications hosted on a server, and/or MAPI, for example.

In one specific implementation, the system 100 comprises a communications and collaboration software product known as Exchange Server™ by Microsoft Corporation. The system 100 can be deployed as a middle-tier system that includes a business logic API that allows the applications 110 included as part of the Exchange Server product to access data stored in the messaging storage locations (also referred to as inboxes or mailboxes). In order to access specific user inboxes, the class 112 of the API 108 is provided that embodies class objects (or class members) that include properties associated with finding each inbox in the enterprise communications and/or collaboration system. Each inbox in the enterprise has an identity defined by encapsulating at least a mailbox server name, a unique mailbox database GUID (globally unique identifier), and a unique mailbox GUID. By encapsulating the information associated with a mailbox into one class, lookups associated with the storage component 104 (e.g., an Active Directory™ storage system by Microsoft Corporation) can be optimized and provide a single source of mailbox information for both authentication and display purposes.

Figure 2:
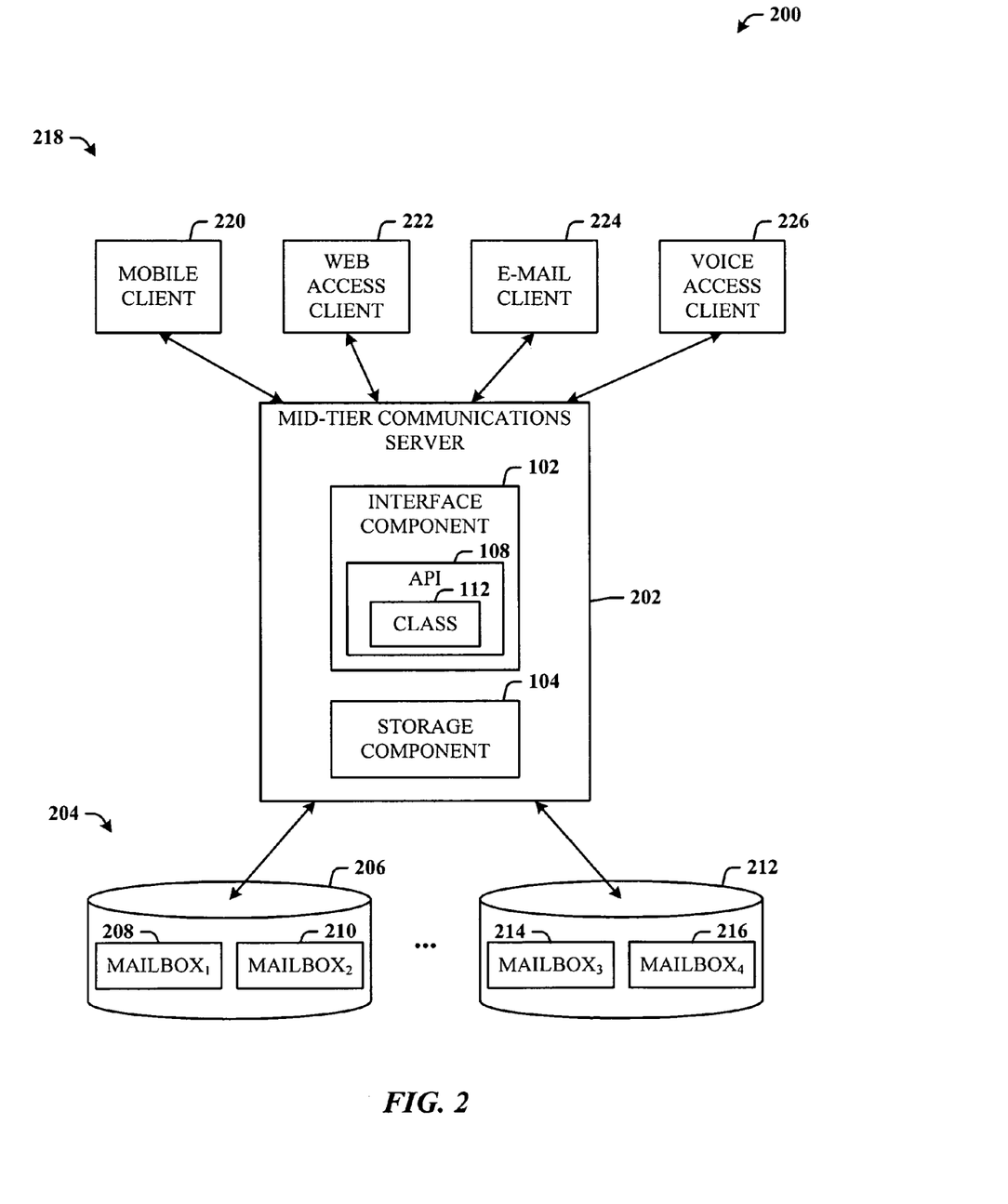
FIG. 2 illustrates an exemplary system for middle-tier implementation of the subject innovation.

FIG. 2 illustrates an exemplary system 200 for middle-tier implementation of the subject innovation. The system 200 includes a mid-tier communications server 202 in which the interface component 102 is employed. The server 202 can include the storage component 104 (e.g., a database subsystem, Active Directory storage system, . . . ) for interfacing with one or more datastores 204 that store user mailboxes (or inboxes). For example, the storage component 104 can provide storage administration services for a first datastore 206 that includes multiple mailboxes, for example, a first mailbox 208 and a second mailbox 210. Additionally, the storage component 104 can provide storage administration services for a second datastore 212 that includes multiple mailboxes, for example, a third mailbox 214 and a fourth mailbox 216.

The interface component 102 facilitates access to each of the mailboxes (208, 210, 214 and 216) via the API 108, and more specifically, the class 112. As described previously, the class 112 serves as a single point of access to all mailboxes (e.g., mailboxes 208, 210, 214 and 216) persisted across multiple datastores 204 of an enterprise. This is facilitated by the class 112 including class members that define or encapsulate properties associated with the mailbox locations. Mailbox locations can be found and accessed across the many datastores 204 of the enterprise, whether associated with the single server 202 or multiple implementations of the server 202. In other words, it is within contemplation of the innovation that a company can employ several communications servers 202 in support of a large number of users. Thus, there can be many datastores 204 and associated mailboxes clustered in a central location and/or distributed across the enterprise geographically and topographically, for example. In all cases, the API 108 and class 112 provide the means by which each user mailbox can be located and accessed.

Access can be by way of a variety of different communications technologies and protocols of clients 218. For example, a user of a mobile client 220 (e.g., a cell phone) can access the server 202 via IP and/or cellular networks seeking to check for messages or other related information of the first mailbox 208 of the first datastore 206. Upon receiving a request from the mobile client 220, the server 202 processes the request through the interface component 102 in accordance with the protocols employed by the mobile client 220. The server 202 can include different applications that support communicating with the different types of clients 218, each corresponding application of which passes the client request to the interface component 102 and API 108. The API 108 provides universal access to all mailboxes of the enterprise datastores 204 via the class 112. The request is processed through the class 112 to locate the first mailbox 208 based at least in part on mailbox information embodied in class members that includes the mailbox server name for the server 202, the unique mailbox database identifier for the first datastore 206, and unique mailbox identifier for the first mailbox 208. Other properties will be described infra.

Similarly, a user of a web access client 222 (e.g., a portable computer) can access the server 202 via IP and/or cellular networks seeking to check for messages or other related information of the second mailbox 210 of the first datastore 206. Upon receiving a request from the web access client 222, the server 202 processes the request through the interface component 108 in accordance with the protocols employed by the web access client 222. The request is processed through the class 112 to locate the second mailbox 210 based at least in part on mailbox information embodied in class members that includes the mailbox server name for the server 202, the unique mailbox database identifier for the first datastore 206, and unique mailbox identifier for the second mailbox 210.

In one implementation of the web access client 222, a part of the user interface in the web access client 222 can be hosted in iframes as part of other web applications. IFrame (or inline frame) is an HTML (hypertext markup language) element technology that facilitates the embedding of another HTML document inside the main document. The web access client 222 exposes a set of web part URLs (uniform resource locators) that allow other applications to request certain portions of the web access UI. For example, another application can load the web access web part URL for the inbox, calendar, or contact folder into an iframe hosted in that application.

Yet again, a user of an e-mail client 224 (e.g., a portable computer, cell phone) can access the server 202 via IP and/or cellular networks seeking to check for messages or other related information of the third mailbox 214 of the second datastore 212. Upon receiving a request from the e-mail client 224, the server 202 processes the request through the interface component 102 in accordance with the protocols employed by the e-mail client 224. The request is processed through the class 112 to locate the third mailbox 214 based at least in part on mailbox information embodied in class members that includes the mailbox server name for the server 202, the unique mailbox database identifier for the second datastore 212, and unique mailbox identifier for the third mailbox 214.

Similarly, a user of a voice access client 226 (e.g., a portable computer, cell phone) can access the server 202 via IP and/or cellular networks seeking to check for messages or other related information of the fourth mailbox 216 of the second datastore 212. Upon receiving a request from the voice access client 226, the server 202 processes the request through the interface component 102 in accordance with the protocols employed by voice access client 226. The request is processed through the class 112 to locate the fourth mailbox 216 based at least in part on mailbox information embodied in class members that includes the mailbox server name for the server 202, the unique mailbox database identifier for the second datastore 212, and unique mailbox identifier for the fourth mailbox 216. The voice access client 226 allows a unified messaging-enabled user to access the corresponding mailbox via a telephone (or other voice communications means). The user can navigate through mailboxes or settings using telephone keys or speech input.

It is to be understood that other clients can be accommodated by the system 200 over that which has been described. Thus, illustration of the four types of clients 218 is exemplary only, and is not be construed as limiting in any way. A common practice is to write APIs on top of APIs to reach a broader audience of customers and systems. For example, services can be written on top of the disclosed API that surface a similar set of operations to programmers talking to the services over the Internet. Thus, programmers that could not previously talk to this API are now able to do so through the layered API.

Figure 3:
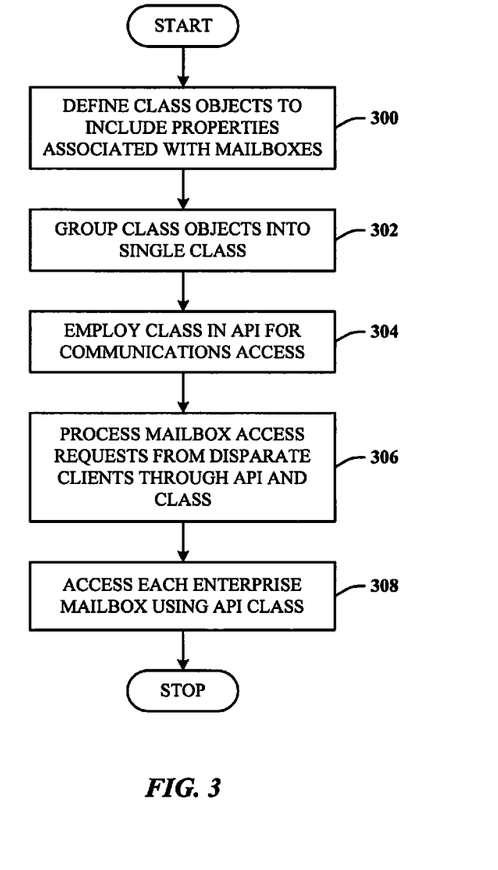
FIG. 3 illustrates a method of providing access to data in accordance with the innovation.

FIG. 3 illustrates a method of providing access to data in accordance with the innovation. While, for purposes of simplicity of explanation, the one or more methodologies shown herein, for example, in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 300, class objects (or members) are defined to include properties associated with finding mailboxes. At 302, the class objects are grouped into a single class. At 304, the class is employed in an API for access by disparate communications applications and protocols. At 306, mailbox access requests from disparate communications clients are processed through the API and class. At 308, each enterprise mailbox can be accessed through the API class based on the corresponding request.

Figure 4:
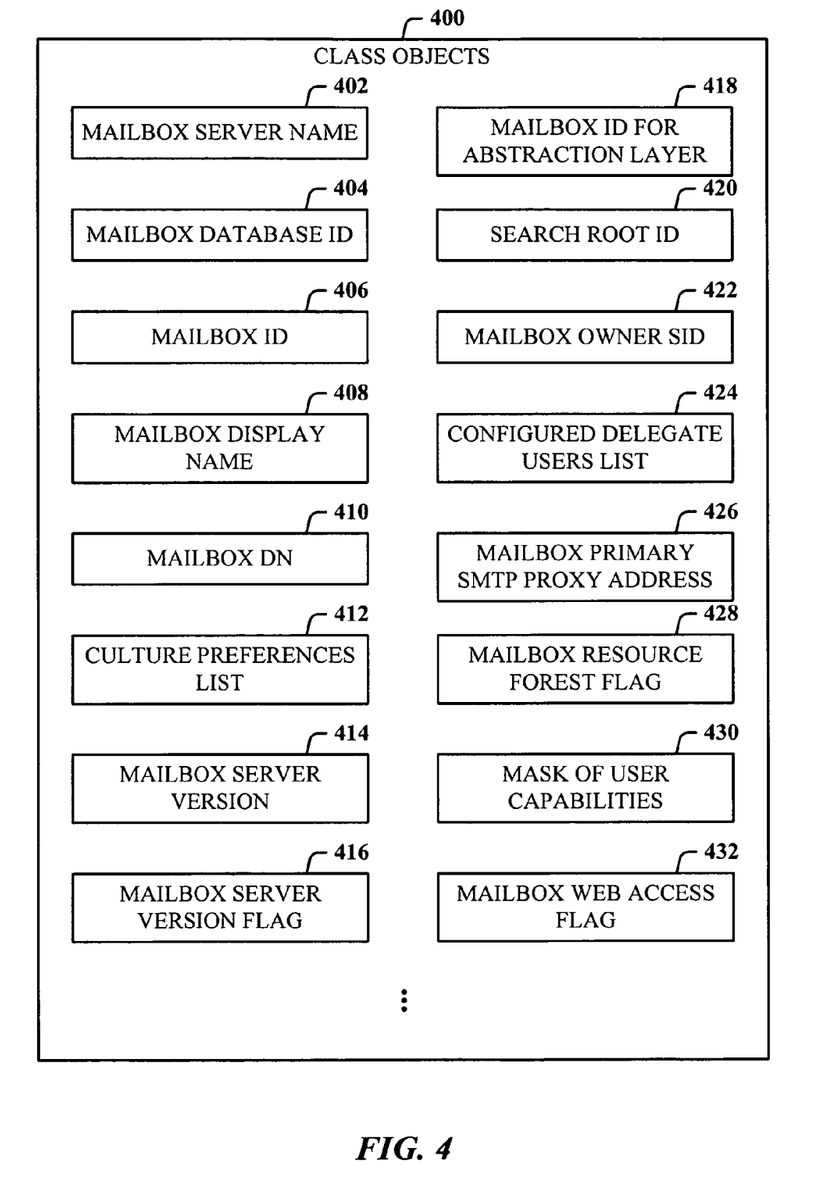
FIG. 4 illustrates a set of exemplary properties that can be encapsulated in class objects for mailbox access in accordance with the innovation.

FIG. 4 illustrates a set of exemplary properties that can be encapsulated in class objects 400 for mailbox access in accordance with the innovation. The objects 400 can include the server name where the mailbox is located (402), a unique identifier for the database on that server that contains the mailbox (404), and a unique identifier for the mailbox (406). Other information that can be encapsulated includes a user friendly display name for the mailbox (408), a distinguished name used to identify the mailbox (410) (e.g., in an Active Directory implementation), an ordered list of culture preferences used by applications exposing UI to an end user (412), the mailbox server version (414), a flag indicating if the mailbox server version is current or not (416), a mailbox identifier for use with an abstraction layer (418)(e.g., to avoid costly lookups in Active Directory), a search root identifier for use with the abstraction layer (420) (this can be used to scope searches to a specific tree in the database), a SID (security identifier) associated with the mailbox owner (422), a list of configured delegate users or additional owners (424), the primary SMTP proxy address associated with the mailbox (426), a flag indicating whether the mailbox is in a resource forest (428), a bit mask of user capabilities (430), and a flag specifying that web access is enabled on the mailbox (432). The set 400 can include fewer or more properties than those listed above.

FIG. 5 illustrates an exemplary class 500 of class objects for utilization in a communications server. Here, the communications server is Exchange Server that utilizes Active Directory, both products by Microsoft Corporation. However, this is not to be construed as limiting in any way. The class can include some or all of the class objects 400 described in FIG. 4, as well as different objects, as desired for the particular implementation.

Figure 6:
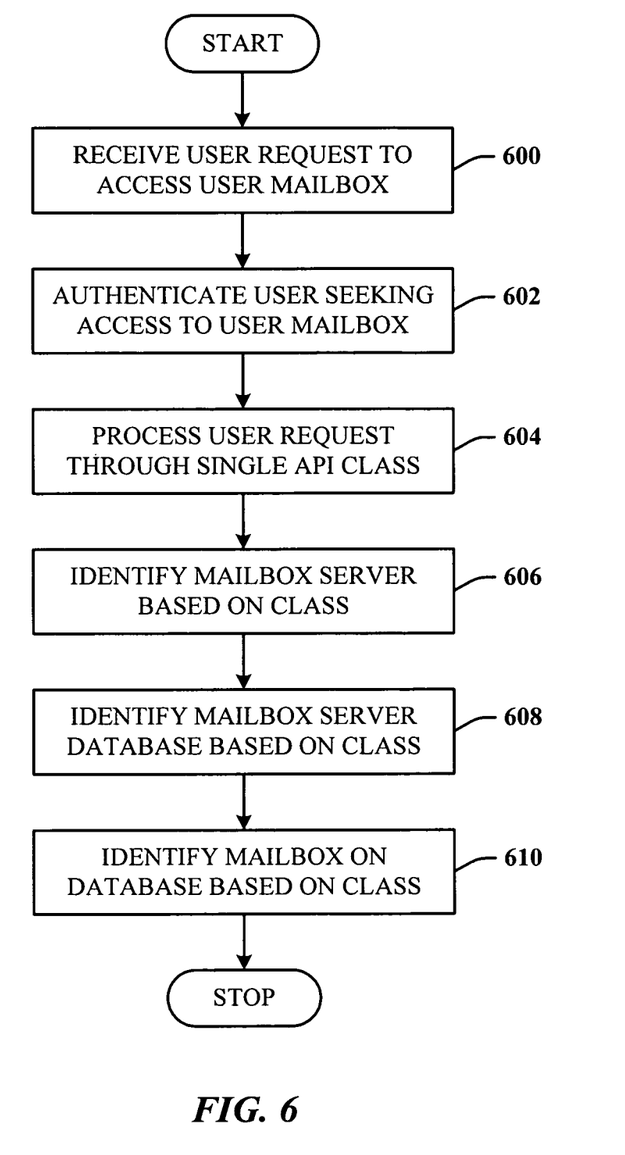
FIG. 6 illustrates a method of facilitating access to a user mailbox via a universal API class.

FIG. 6 illustrates a method of facilitating access to a user mailbox via a universal API class. At 600, a user request is received for access to a user mailbox. The request can be generated from one of several different client types and devices. At 602, the user (or user client) making the request is authenticated to ensure that the proper user is allowed access to the mailbox. At 604, the request is processed through the single API class. At 606, the class facilitates identification of the mailbox server of which the mailbox is associated. At 608, the class facilitates identification of the mailbox server database on which the mailbox resides. At 610, the class facilitates identification of the mailbox on the associated database.

Figure 7:
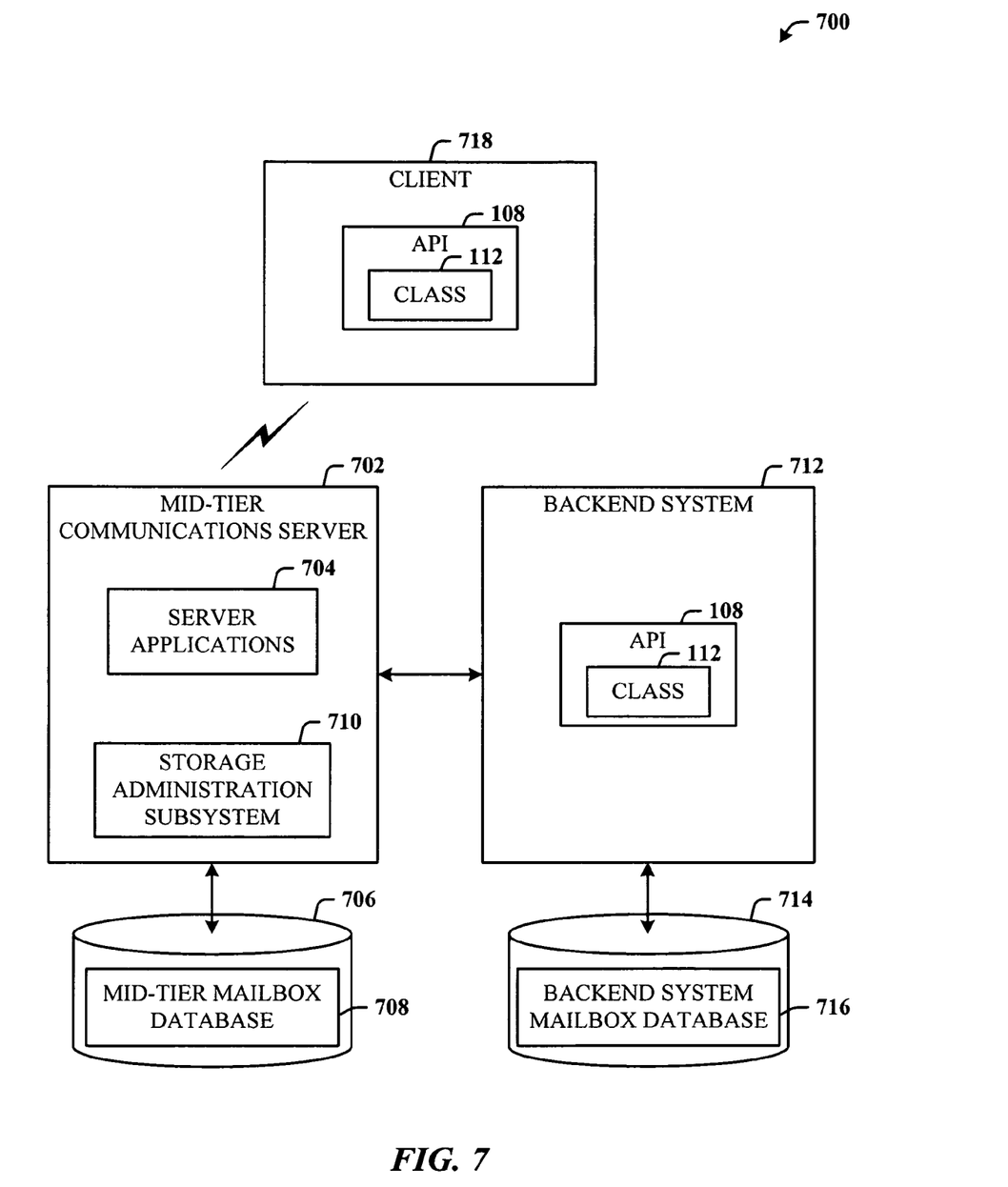
FIG. 7 illustrates a system that employs alternative locations in which an API class can be utilized for locating user mailboxes.

FIG. 7 illustrates a system 700 that employs alternative locations in which an API class can be utilized for locating user mailboxes. The system 700 includes a mid-tier communications server 702 for processing enterprise communications. The server 702 can include server applications 704 that facilitate communications from different types of user clients (e.g., cell phones, portable computers) that can be utilized in the enterprise. The server 702 can have an associated mid-tier mailbox database 706 residing on an associated mid-tier datastore 708, and administered by a mid-tier storage administration subsystem 710. The system 700 can also include a backend system 712 as part of the enterprise that includes the API 108 and class 112. Additionally, the backend system 712 can also include an associated backend datastore 714 that stores, among other things, a backend database of enterprise mailboxes 716.

In operation, when a client 718 communicates with the enterprise in order to request access a user mailbox, the mailbox can be located on either of the datastores (706 or 714). One of the server applications 704 can communicate the request to the backend system 712 which processes the request through the API 108 and class 112. The request can then be processed for routing back to the mid-tier system 702, to the storage subsystem 710, and ultimately, to the appropriate mailbox on the mid-tier datastore 706. Alternatively, the request can be processed against the backend system datastore 714, when the user mailbox resides there.

In yet another alternative implementation, the client 718 includes the API 108 and class 112. Thus, a mailbox request can be processed directly by the client 718 for routing and access to the appropriate database, for example, the mid-tier database 708 or the backend system database 716. User authentication can then be processed at the datastore subsystem, for example, prior to granting access to the mailbox.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 8:
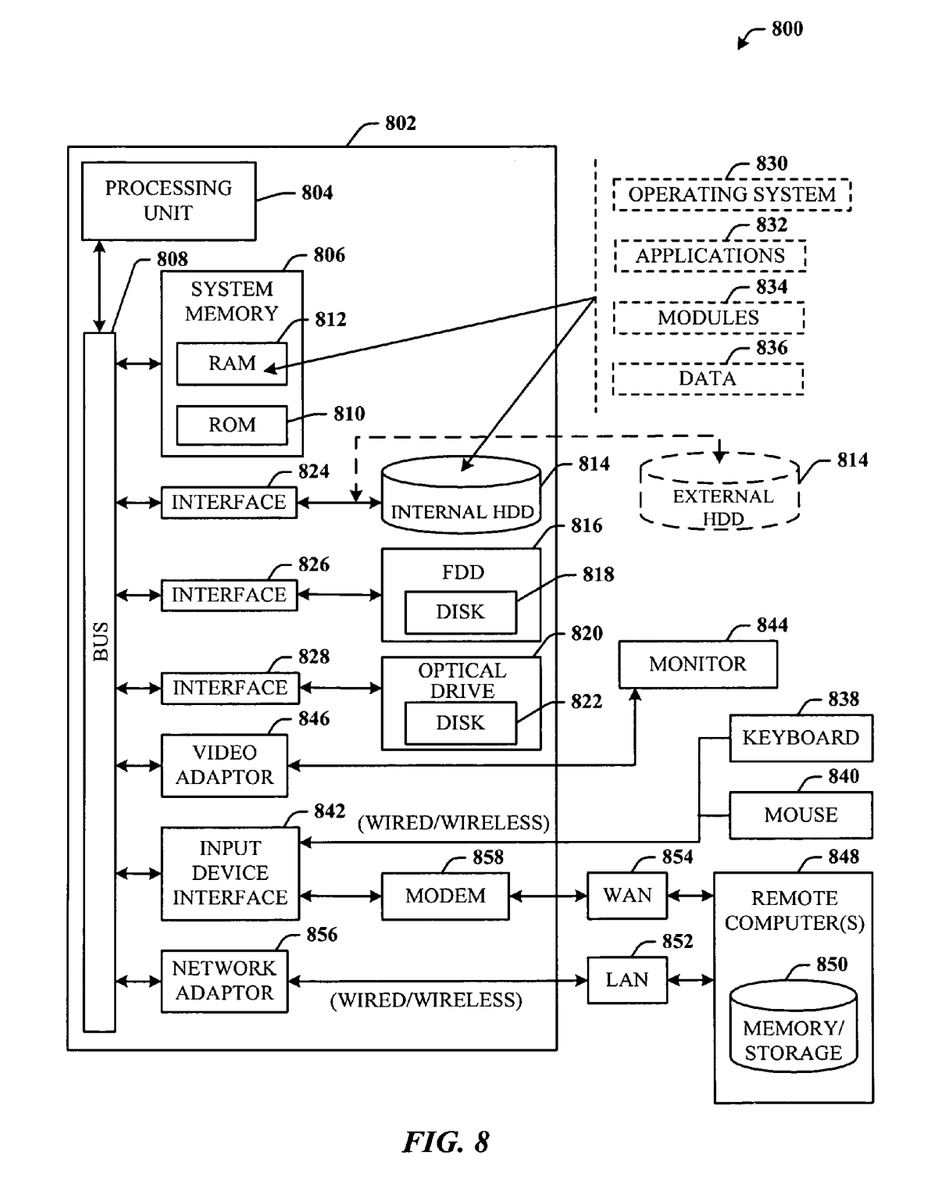
FIG. 8 illustrates a block diagram of a computing system operable to execute the universal access class of the disclosed architecture.

Referring now to FIG. 8, there is illustrated a block diagram of a computing system 800 operable to execute the universal access class of the disclosed architecture. In order to provide additional context for various aspects thereof, FIG. 8 and the following discussion are intended to provide a brief, general description of a suitable computing system 800 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 8, the exemplary computing system 800 for implementing various aspects includes a computer 802, the computer 802 including a processing unit 804, a system memory 806 and a system bus 808. The system bus 808 provides an interface for system components including, but not limited to, the system memory 806 to the processing unit 804. The processing unit 804 can be any of various commercially available processors. Dual microprocessors and other multi-processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 includes read-only memory (ROM) 810 and random access memory (RAM) 812. A basic input/output system (BIOS) is stored in a non-volatile memory 810 such as ROM, EPROM, EEPROM, which BIOS contains the basic routines that help to transfer information between elements within the computer 802, such as during start-up. The RAM 812 can also include a high-speed RAM such as static RAM for caching data.

The computer 802 further includes an internal hard disk drive (HDD) 814 (e.g., EIDE, SATA), which internal hard disk drive 814 may also be configured for external use in a suitable chassis (not shown), a magnetic floppy disk drive (FDD) 816, (e.g., to read from or write to a removable diskette 818) and an optical disk drive 820, (e.g., reading a CD-ROM disk 822 or, to read from or write to other high capacity optical media such as the DVD). The hard disk drive 814, magnetic disk drive 816 and optical disk drive 820 can be connected to the system bus 808 by a hard disk drive interface 824, a magnetic disk drive interface 826 and an optical drive interface 828, respectively. The interface 824 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 812, including an operating system 830, one or more application programs 832, other program modules 834 and program data 836. All or portions of the operating system, applications, modules, and/or data can also be cached in the RAM 812. It is to be appreciated that the innovation can be implemented with various commercially available operating systems or combinations of operating systems. Here, the applications 832 and/or data modules 834 can include the interface component 102, the API 108 and class 112 of FIG. 1.

A user can enter commands and information into the computer 802 through one or more wired/wireless input devices, for example, a keyboard 838 and a pointing device, such as a mouse 840. Other input devices (not shown) may include a microphone, an IR remote control, a joystick, a game pad, a stylus pen, touch screen, or the like. These and other input devices are often connected to the processing unit 804 through an input device interface 842 that is coupled to the system bus 808, but can be connected by other interfaces, such as a parallel port, an IEEE 1394 serial port, a game port, a USB port, an IR interface, etc.

A monitor 844 or other type of display device is also connected to the system bus 808 via an interface, such as a video adapter 846. In addition to the monitor 844, a computer typically includes other peripheral output devices (not shown), such as speakers, printers, etc.

The computer 802 may operate in a networked environment using logical connections via wired and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wired/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the local network 852 through a wired and/or wireless communication network interface or adapter 856. The adaptor 856 may facilitate wired or wireless communication to the LAN 852, which may also include a wireless access point disposed thereon for communicating with the wireless adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wired or wireless device, is connected to the system bus 808 via the serial port interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 9:
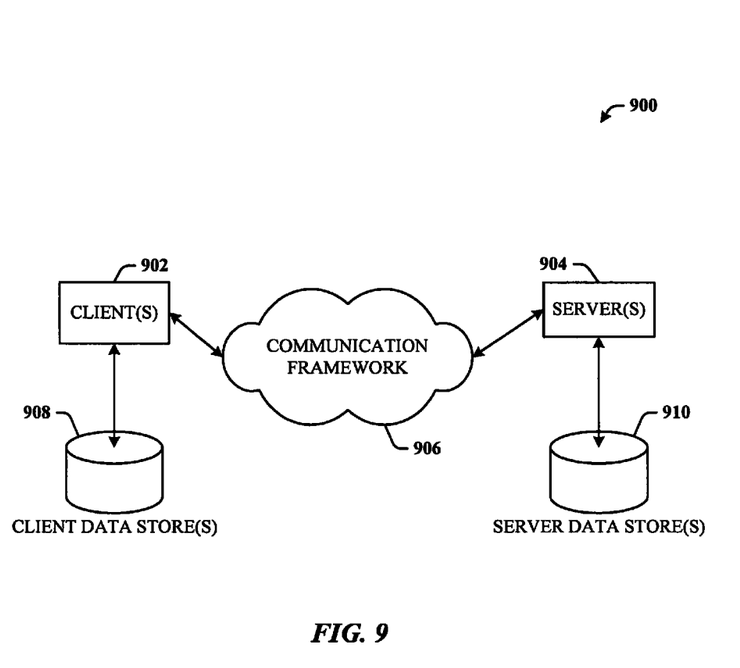
FIG. 9 illustrates a schematic block diagram of an exemplary computing environment that facilitates universal access via an API class in accordance with the innovation.

Referring now to FIG. 9, there is illustrated a schematic block diagram of an exemplary computing environment 900 that facilitates universal access via an API class in accordance with the innovation. The system 900 includes one or more client(s) 902. The client(s) 902 can be hardware and/or software (e.g., threads, processes, computing devices). The client(s) 902 can house cookie(s) and/or associated contextual information by employing the subject innovation, for example.

The system 900 also includes one or more server(s) 904. The server(s) 904 can also be hardware and/or software (e.g., threads, processes, computing devices). The servers 904 can house threads to perform transformations by employing the architecture, for example. One possible communication between a client 902 and a server 904 can be in the form of a data packet adapted to be transmitted between two or more computer processes. The data packet may include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

The clients 902 can includes the clients 218 of FIG. 2 and the client 718 of FIG. 7, for example. The servers 904 can include the mid-tier server 202 of FIG. 2 and, the mid-tier communications server 702, backend system 712 and associated datastores (706 and 714) of FIG. 7.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for accessing data, comprising:
a storage component for storing messages of disparate data types in a plurality of storage locations, each of the plurality of storage locations associated with a principal, the disparate data types corresponding to different types of clients having at least one of different communications technologies or protocols in storage locations of users,
a processor; and
one or more memory storage devices coupled to the processor and storing instructions executable by the processor to implement an interface component at a mail server, the interface component including:
an application programming interface (API) defining a single class encapsulating properties identifying and used to access a mailbox, the single class serving as a single access means for universally accessing the storage locations persisted across multiple datastores via different applications that support communicating with the different types of clients, wherein the single class includes:
a plurality of class members, each class member encapsulating properties associated with a storage location from among the plurality of storage locations and uniquely identifying a storage location associated with a principal from among the plurality of storage locations storing messages of disparate data types, the class members including:
a mailbox server name,
a mailbox database identifier (ID) associated with a database containing the storage location, and
a mailbox ID associated with the corresponding principal,
wherein the different types of clients include a voice access client and a data client;
the instructions further executable by the processor to cause the system to:
receive a request at the application programming interface for an item associated with a principal of a mailbox, the request formatted to be compatible with the API and including the mailbox server name, mailbox database identifier, and mailbox ID associated with the principal;
processing the request through the single class of the API, wherein processing the first request includes:
identifying a mailbox server associated with the mailbox based on the request received at the API;
identifying the database containing the storage location; and
identifying the mailbox on the identified database.

2. The system of claim 1, wherein the single class provided by the interface component is a single access means to personal user storage locations of an enterprise.

3. The system of claim 1, wherein the single class provided by the interface component facilitates access to the storage locations, which are messaging inboxes, of an enterprise for authentication and display purposes.

4. The system of claim 1, wherein each of the storage locations accessible via the interface component is identified via the single class using class members that include at least one of
a display name for the storage location or
a distinguished name for identifying the storage location.

5. The system of claim 1, wherein each of the storage locations accessible via the interface component is identified via the single class using class members that include at least one of
an ordered list of culture preferences or
a storage location server version.

6. The system of claim 1, wherein each of the storage locations accessible via the interface component is identified via the single class using class members that include at least one of
a flag that indicates if a storage location server version is current or
a storage location ID for use by an abstraction layer.

7. The system of claim 1, wherein each of the storage locations accessible via the interface component is identified via the single class using class members that include at least one of
 a search root ID for scoping a search to a specific tree or
 a security ID associated with a storage location owner.

8. The system of claim 1, wherein each of the storage locations accessible via the interface component is identified via the single class using class members that include at least one of
 a list of configured delegate users or
 a primary proxy server address associated with a storage location.

9. The system of claim 1, wherein each of the storage locations accessible via the interface component is identified via the single class using class members that include at least one of
 a flag that indicates the storage location is in a resource forest,
 a bit mask of user capabilities, or
 a flag that specifies that web access is enabled for the storage location.

10. The system of claim 1, wherein the interface component is embodied in the mid-tier communications server of an enterprise for universal access to the user storage locations of the enterprise via disparate mobile communications clients.

11. The system of claim 1, wherein the API comprises a layered API.

12. A computer-implemented method of providing access to data employing a computer programmed to perform the method, comprising acts of:
 defining class members to encapsulate properties identifying and used to access mailboxes of an enterprise persisted across multiple datastores storing messages of disparate data types, the class members exposed to disparate clients utilizing at least one of different communications technologies or protocols via an application programming interface (API), and the properties including a mailbox server name, a mailbox database identifier, and a mailbox identifier;
 grouping the class members into a single class encapsulating the properties identifying and used to access mailboxes;
 receiving a request via the application programming interface (API) including one or more of the mailbox server name, the mailbox database identifier, and the mailbox identifier of the single class and locating one or more mailboxes of the disparate clients across the multiple datastores based on the request;
 processing requests through the single class of the API, wherein processing the requests includes:
  identifying a mailbox server associated with the mailbox based on a mailbox server name included in a request received at the API;
  identifying the database containing the storage location based on the mailbox database identifier included in the request; and
  identifying the mailbox on the identified database based on the mailbox identifier included in the request; and
 providing access to the messages of disparate data types in the mailboxes from the disparate clients via the application programming interface (API) defining the single class at a mail server based on the mailbox server names, the mailbox database identifiers identifying and used to access databases containing the mailboxes, and the mailbox identifiers corresponding to respective clients, the respective clients including a voice access client and a data client.

13. The method of claim 12, further comprising
 embodying the single class of members in the API to provide universal access to the mailboxes from the disparate applications.

14. The method of claim 12, wherein the class members in the act of defining include
 a distinguished name for LDAP-based directory services,
 a user friendly display name for the mailbox, and
 a mailbox server version.

15. The method of claim 14, wherein the class members in the act of defining include properties related to
 an ordered list of culture preferences,
 a flag indicating if the mailbox server version is current, and
 a mailbox identifier for use with the directory services.

16. The method of claim 12, wherein the class members in the act of defining include
 properties related to a search root identifier for use with an LDAP based directory service,
 a SID associated with a mailbox owner, and
 a list of configured delegate users.

17. The method of claim 16, wherein the class members in the act of defining include
 properties related to an SMTP proxy address associated with a mailbox,
 a flag that indicates if the mailbox is in a resource forest and
 a bit mask of user capabilities.

18. The method of claim 12, further comprising authenticating access to one of the mailboxes before the act of providing access to the mailbox.

19. A computer-implemented system, comprising:
 computer-implemented means hosted by a mail server for defining class members of a single class encapsulating identities of messaging storage locations storing messages of disparate data types, the messaging storage locations persisted across multiple enterprise datastores of an enterprise communications system representing disparate communications clients, the class members exposed to the disparate communications clients via an application programming interface (API), the properties including at least a mailbox server name, a mailbox database identifier (ID) associated with a database containing a messaging storage location, and a mailbox ID;
 computer-implemented means hosted by the mail server for grouping the class members into a single class encapsulating properties identifying and used to access a mailbox, the single class employed for access by the disparate communications clients having disparate communications applications or protocols;
 computer-implemented means hosted by the mail server for instantiating the single class as part of the API of the communications and/or collaboration system; and
 computer-implemented means hosted by the mail server for providing access to the messaging storage locations from the disparate communications clients via the API, the disparate communications clients including a voice access client and a data client,
 wherein the computer-implemented means for providing access to the messaging storage locations being configured to, when executed, process requests through the single class of the API, wherein processing the requests includes:

identifying a mailbox server associated with the mailbox based on a mailbox server name included in a request received at the API;

identifying the database containing the storage location based on the mailbox database identifier included in the request; and identifying the mailbox on the identified database based on the mailbox identifier included in the request.

* * * * *